US012072791B2

(12) United States Patent
Yin et al.

(10) Patent No.: US 12,072,791 B2
(45) Date of Patent: Aug. 27, 2024

(54) AUTOMATED IDENTIFICATION OF INPUT ELEMENTS IN A GRAPHICAL USER INTERFACE

(71) Applicant: MICRO FOCUS LLC, Santa Clara, CA (US)

(72) Inventors: Peng-Ji Yin, Shanghai (CN); Cheng Hua, Shanghai (CN); Jie Zhang, Shanghai (CN)

(73) Assignee: Micro Focus LLC, Santa Clara, CA (US)

(*) Notice: Subject to any disclaimer, the term of this patent is extended or adjusted under 35 U.S.C. 154(b) by 32 days.

(21) Appl. No.: 17/312,279

(22) PCT Filed: Dec. 28, 2018

(86) PCT No.: PCT/CN2018/124812
§ 371 (c)(1),
(2) Date: Jun. 9, 2021

(87) PCT Pub. No.: WO2020/133201
PCT Pub. Date: Jul. 2, 2020

(65) Prior Publication Data
US 2022/0107883 A1 Apr. 7, 2022

(51) Int. Cl.
*G06F 11/36* (2006.01)
*G06V 10/764* (2022.01)
*G06V 30/30* (2022.01)

(52) U.S. Cl.
CPC ...... *G06F 11/3688* (2013.01); *G06F 11/3664* (2013.01); *G06V 10/765* (2022.01); *G06F 11/3684* (2013.01); *G06V 30/30* (2022.01)

(58) Field of Classification Search
CPC .......... G06F 11/36–3696; G06F 9/451; G06V 10/765
See application file for complete search history.

(56) References Cited

U.S. PATENT DOCUMENTS 5,708,730 A * 1/1998 Itonori ................. G06V 30/412
715/250
9,008,443 B2 * 4/2015 Dejean ................. G06V 30/414
382/203

(Continued)

FOREIGN PATENT DOCUMENTS

WO WO-2020133201 A1 * 7/2020 .......... G06F 11/3664

OTHER PUBLICATIONS

International Search Report and Written Opinion prepared by the ISA/CN on Sep. 12, 2019, for International Application No. PCT/CN2018/124812.

(Continued)

*Primary Examiner* — Todd Aguilera
(74) *Attorney, Agent, or Firm* — Sheridan Ross P.C.

(57) ABSTRACT

A computing device includes a processor and a medium storing instructions. The instructions are executable by the processor to: identify, based on a blob detection analysis, a plurality of potential input elements in a graphical user interface (GUI); determine a set of rows including potential input elements that are in a horizontal alignment and in a same size range; determine a set of columns including potential input elements that are in a vertical alignment and in a same size range; determine a set of input elements comprising multiple potential input elements that are located at intersections of the identified set of rows and the identified set of columns; and perform automated testing of the GUI using the determined set of input elements.

17 Claims, 8 Drawing Sheets

(56) References Cited

U.S. PATENT DOCUMENTS

| | | | |
|---|---|---|---|
| 9,424,167 B2* | 8/2016 | Lee | G06F 3/0484 |
| 9,465,726 B2* | 10/2016 | Kozhuharov | G06F 11/3414 |
| 9,792,895 B2* | 10/2017 | Khintsitskiy | G10L 13/086 |
| 9,984,471 B2 | 5/2018 | Becker et al. | |
| 10,339,206 B2* | 7/2019 | Hoford | G06F 8/38 |
| 10,733,754 B2* | 8/2020 | Dayanandan | G06F 8/35 |
| 10,936,864 B2* | 3/2021 | Janardhanan | G06F 40/186 |
| 2011/0131551 A1 | 6/2011 | Amichai | |
| 2012/0124495 A1 | 5/2012 | Amichai | |
| 2013/0159196 A1* | 6/2013 | DiZoglio | G06Q 20/20 705/72 |
| 2013/0343658 A1* | 12/2013 | Dejean | G06V 30/414 382/203 |
| 2014/0165040 A1 | 6/2014 | Augustin | |
| 2014/0366005 A1* | 12/2014 | Kozhuharov | G06F 11/3696 717/125 |
| 2015/0339213 A1 | 11/2015 | Lee | |
| 2016/0171329 A1* | 6/2016 | Khintsitskiy | G10L 13/00 382/182 |
| 2017/0337321 A1* | 11/2017 | Hoford | G06F 40/106 |
| 2018/0024901 A1 | 1/2018 | Tankersley | |
| 2018/0203571 A1* | 7/2018 | Dayanandan | G06F 8/38 |
| 2019/0377942 A1* | 12/2019 | Janardhanan | G06F 40/103 |

OTHER PUBLICATIONS

"DNS Firewall," Cloudflare Inc., retrieved Aug. 15, 2018, 10 pages [retrieved online from: www.cloudflare.com/dns/dns-firewall].

"Image Segmentation with Watershed Algorithm," OpenCV, Aug. 15, 2018, 4 pages [retrieved online from: docs.opencv.org/ref/master/d3/db4/tutorial_py_watershed.html].

Abastillas "Real-Time Hand Gesture Detection and Recognition Using Simple Heuristic Rules," Massey University, Jun. 2011, 56 pages.

Acevedo-Avila et al. "A Linked List-Based Algorithm for Blob Detection on Embedded Vision-Based Sensors," Sensors, Jun. 2016, vol. 16, No. 6, Article 782, 25 pages.

Gupta et al. "Study on Object Detection using Open CV—Python," International Journal of Computer Applications, Mar. 2017, vol. 162, No. 8, pp. 17-21.

International Search Report/Written Opinion; PCT/CN2018/124812; Mailed Sep. 26, 2019; 6 pages.

Patil et al. "Blob Detection Technique Using Image Processing for Identification of Machine Printed Characters," International Journal of Innovations in Engineering Research and Technology Oct. 2015 vol. 2 No. 10 8 pages.

Prince "Announcing 1.1.1.1: the fastest, privacy-first consumer DNS service," Cloudflare Inc., Apr. 1, 2018, 13 pages [retrieved online from: blog.cloudlfare.com/announcing-1111].

* cited by examiner

AUTOMATED IDENTIFICATION OF INPUT ELEMENTS IN A GRAPHICAL USER INTERFACE

CROSS-REFERENCE TO RELATED APPLICATIONS

This application is a national stage application under 35 U.S.C. 371 and claims the benefit of PCT Application No. PCT/CN2018/124812 having an international filing date of 28 Dec. 2018, which designated the United States, the entire contents of which are incorporated herein by reference.

BACKGROUND

With increasing use of computer systems, it becomes increasingly important to have reliable software. As such, software applications are often subjected to extensive testing to detect and eliminate errors. For software application with graphical user interfaces (GUIs), such testing may involve interacting with screen elements in different combinations and/or scenarios. For example, a tester may use a computer mouse to select various screen elements such as buttons, sliders, hyperlinks, menus, and so forth.

BRIEF DESCRIPTION OF THE DRAWINGS

Some implementations are described with respect to the following figures.

DETAILED DESCRIPTION

Testing of computer applications with graphical user interfaces (GUIs) can be time-consuming and expensive. For example, human testers may have to manually perform various GUI input commands, such as mouse clicks, keyboard inputs, and so forth. As such, the ability to automate the testing of GUIs may reduce the time and cost associated with software validation. Such automated testing may require information about the screen locations of the GUI elements that receive user inputs. However, some GUIs may include input elements that do not have pre-defined screen locations. Accordingly, it may be difficult to perform automated testing of GUIs with input elements that do not have pre-defined screen locations.

As described further below with reference to FIGS. 1-6, some implementations may provide a technique for automated identification of input elements in a GUI. In some examples, the identification technique may include performing a blob detection analysis on an image of the GUI. The blob detection analysis may identify a set of screen elements that could possibly be input elements (referred to as "potential input elements"). Further, the identification technique may include forming rows and columns across at least some of the potential input elements, and determining the intersections of the rows and columns. In some implementations, the potential input elements that are located at the intersections may be identified as the set of input elements that are used for automated testing of the GUI. Accordingly, some implementations may provide improved automated testing of GUIs.

Figure 1:
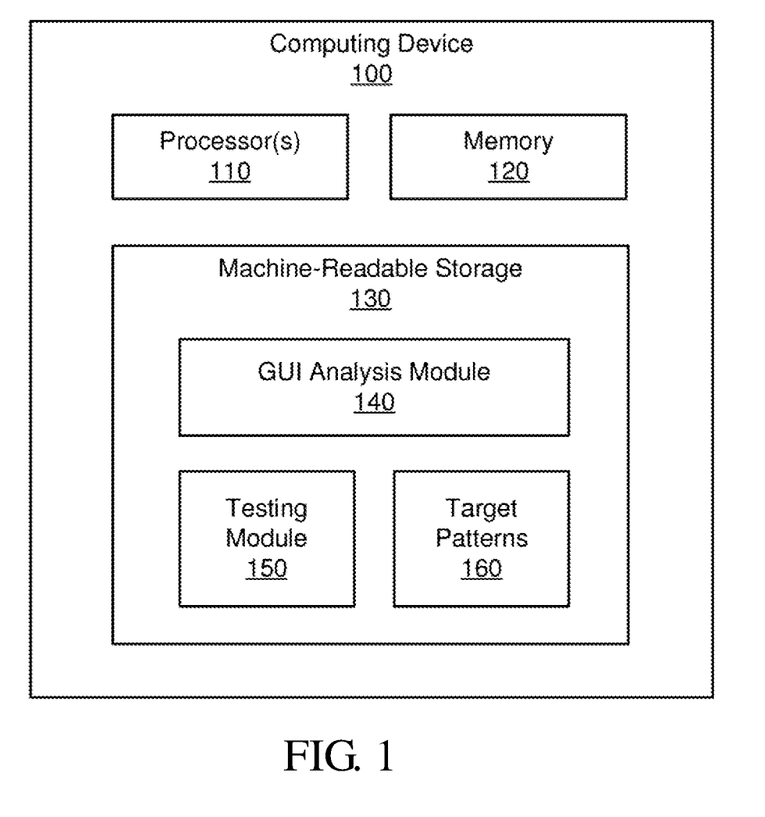
FIG. 1 is a schematic diagram of an example system, in accordance with some implementations.

FIG. 1 is a schematic diagram of an example computing device 100, in accordance with some implementations. The computing device 100 may be, for example, a computer, a portable device, a server, a network device, a communication device, etc. Further, the computing device 100 may be any grouping of related or interconnected devices, such as a blade server, a computing cluster, and the like. Furthermore, in some implementations, the computing device 100 may be a dedicated device or appliance for automated analysis and/or testing of GUIs.

As shown, the computing device 100 can include processor(s) 110, memory 120, and machine-readable storage 130. The processor(s) 110 can include a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 can include a GUI analysis module 140, a testing module 150, and target patterns 160.

As shown in FIG. 1, in some implementations, the modules 140, 150 may be implemented as executable instructions stored in the machine-readable storage 130. However, the modules 140, 150 can be implemented in any suitable manner. For example, some or all of the modules 140, 150 could be hard-coded as circuitry included in the processor(s) 110. In other examples, some or all of the modules 140, 150 could be implemented on a remote computer (not shown), as web services, and so forth. In another example, the modules 140, 150 may be implemented in one or more controllers of the computing device 100. In some implementations, the target patterns 160 may store data in one or more organized structures (e.g., relational tables, extensible markup language (XML) files, flat files, and so forth).

In one or more implementations, the GUI analysis module 140 may automatically identify input elements within a GUI screen. In some examples, the GUI analysis module 140 may identify input elements in GUIs having some characteristics that may interfere with automated identification of input elements. Examples of such GUIs are described below with reference to FIGS. 2A-2B.

In one or more implementations, the GUI analysis module 140 may perform a blob detection analysis to identify potential input elements of a GUI. As used herein, "blob detection" refers to computer image analysis that detects regions that are different from surrounding regions in terms of one or more properties (e.g., brightness, color, etc.). For example, blob detection may be based on differential analysis (e.g., using derivatives of a function relative to position), on the local maxima and minima of a function, and so forth. The term "blob" may refer to a detected region that is different from its surrounding regions. In some implementations, the detected blobs may be identified as screen elements that could possibly be input elements (referred to as "potential input elements"). In one or more implementations, the GUI analysis module 140 may form rows and columns based on subsets of potential input elements, and may determine the intersections of the rows and columns. Furthermore, the GUI analysis module 140 may identify the intersections as the set of input elements to be used for testing. In some implementations, the testing module 150 may perform automated testing of a GUI using the identified set of input elements. The functionality of the GUI analysis module 140 is described further below with reference to FIGS. 2A-4E, which show various non-limiting examples.

Figure 2A:
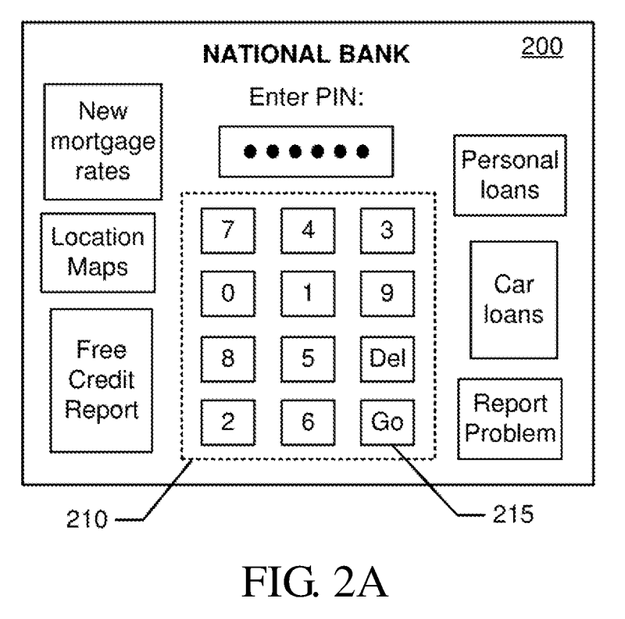
FIGS. 2A-2B are illustrations of example graphical user interfaces, in accordance with some implementations.
Figure 2B:
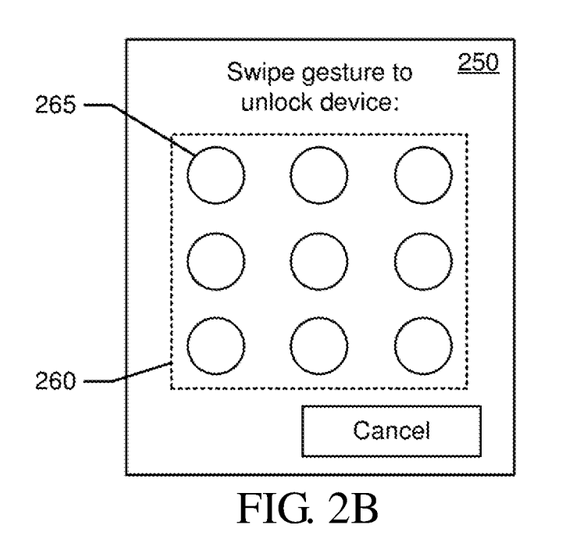

Referring now to FIGS. 2A-2B, shown are example GUI screens 200, 250, in accordance with some implementations. For example, referring to FIG. 2A, the GUI 200 may be, for example, an interface screen for a website or automatic teller machine (ATM) of a particular bank. As shown, the GUI 200 may present a region 210 including multiple input elements 215 to receive user inputs. Further, the GUI 200 may include numerous screen elements surrounding the region 210, such as advertisements, hyperlinks, data entry field, screen title, and so forth.

Assume that one or more characteristics of the GUI 200 may cause difficulty in performing automated testing. For example, the input elements 215 may be numeric keys that are displayed in a randomized order each time the GUI 200 is displayed. Such randomization may be performed to improve password security (e.g., to make it difficult to determine the PIN code based on observations of inputs on various portions of the GUI 200). However, because the numeric keys are not presented in consistent locations, it may be difficult to automate the entry of numeric codes in the GUI 200. Further, the presence of other screen elements that are not related to entry of the numeric code may interfere with the automatic determination of the locations of the input elements 215. For example, a computer vision algorithm may incorrectly identify an advertisement as an input element, thereby causing errors during automated testing.

Referring now to FIG. 2B, the GUI screen 250 may be, for example, a touch screen for receiving a swipe gesture to unlock a device (e.g., a tablet or smartphone). As shown, the GUI 250 may present a region 260 including multiple input elements 265 to receive a swipe gesture (e.g., a swipe that forms a particular pattern and/or sequence overlaid on the input elements 265). Further, the GUI 250 may include other elements surrounding the region 260, such as a screen title and a "Cancel" command button.

Assume that one or more characteristics of the GUI 260 may cause difficulty in performing automated testing. For example, the separations between the input elements 265 may vary when the GUI 260 on device screens of different sizes, aspect ratios, and/or resolutions. Accordingly, because the input elements 265 are not presented in consistent locations, it may be difficult to automate the entry of swipe gestures that are defined according to the input elements 265. Further, the presence of other screen elements that are not related to entry of swipe gestures may interfere with the automatic determination of the locations of the input elements 265.

Figure 3:
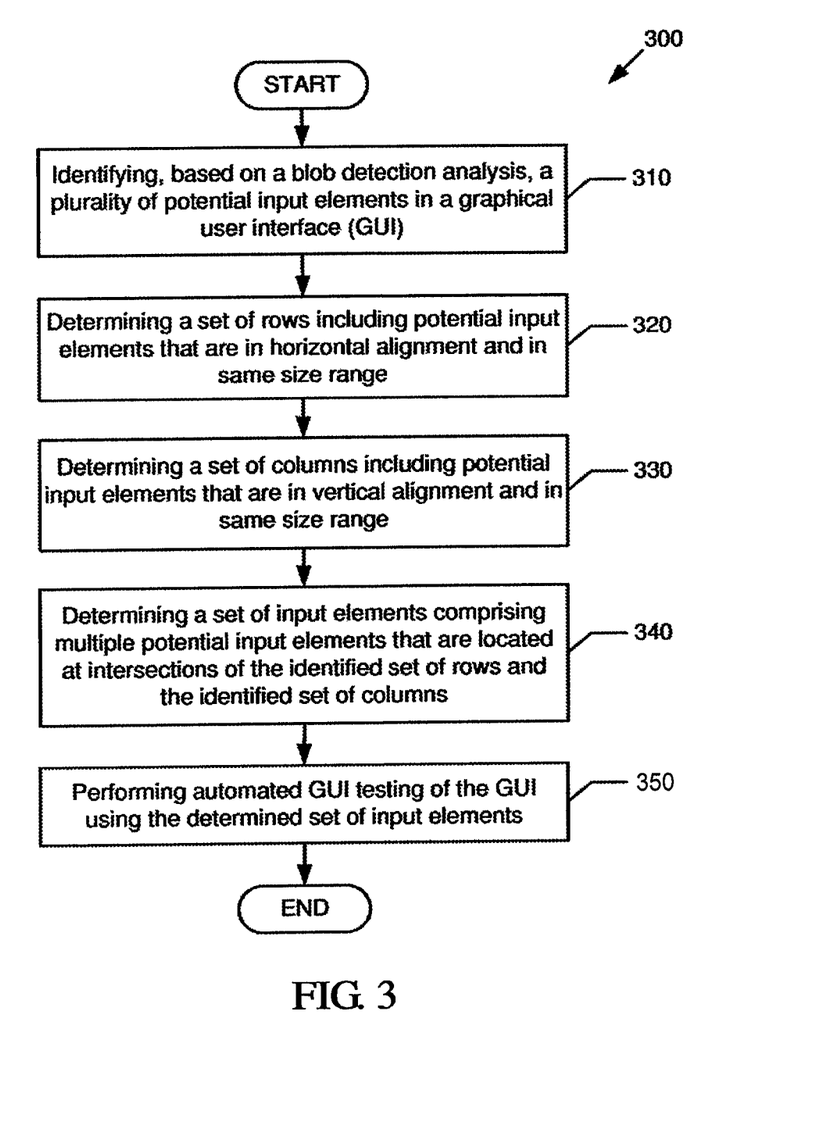
FIG. 3 is a flow diagram of an example process, in accordance with some implementations.

Referring now to FIG. 3, shown is an example process 300, in accordance with some implementations. In some examples, the process 300 may be performed by some or all of the computing device 100 shown in FIG. 1. The process 300 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1, 2A-2B, and 4A-4E, which shows examples in accordance with some implementations. However, other implementations are also possible.

Block 310 may include identifying, based on a blob detection analysis, a plurality of potential input elements in a graphical user interface (GUI). For example, referring to FIGS. 1-2A, the GUI analysis module 140 may perform a blob detection analysis of the GUI 200. The blob detection analysis may identify blobs corresponding to each distinct element, including the input elements 215, advertisements, hyperlinks, data entry field, screen title, and so forth.

In one or more implementations, the detected blobs may be used to define a set of potential input elements (i.e., candidate regions that could potentially be input elements of the GUI screen). For example, a potential input element may be defined in terms of the location, shape, and/or size of a detected blob. In some examples described herein, the potential input elements may be represented by a mapping to respective regions of the GUI screen.

Figure 4A:
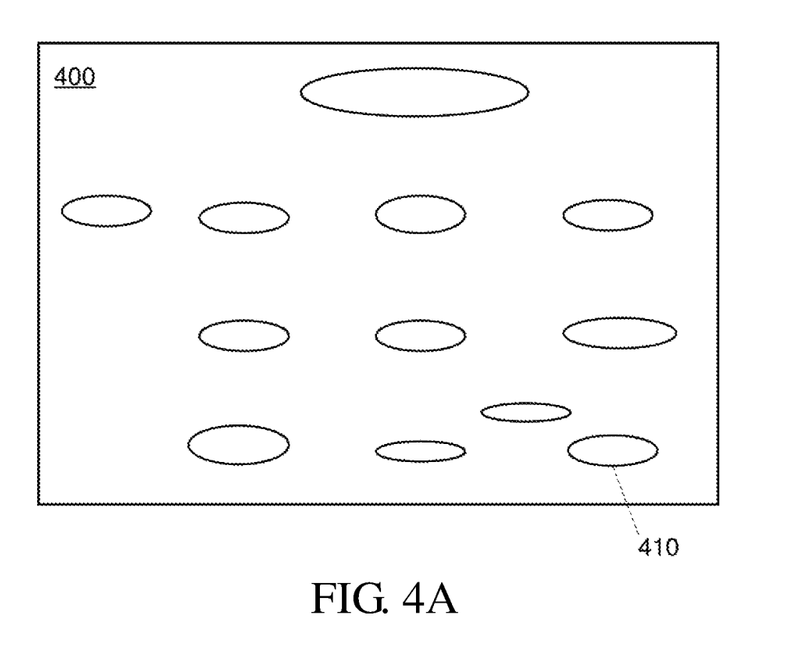
FIGS. 4A-4E are illustrations of an example mapping of potential input elements, in accordance with some implementations.
Figure 4B:
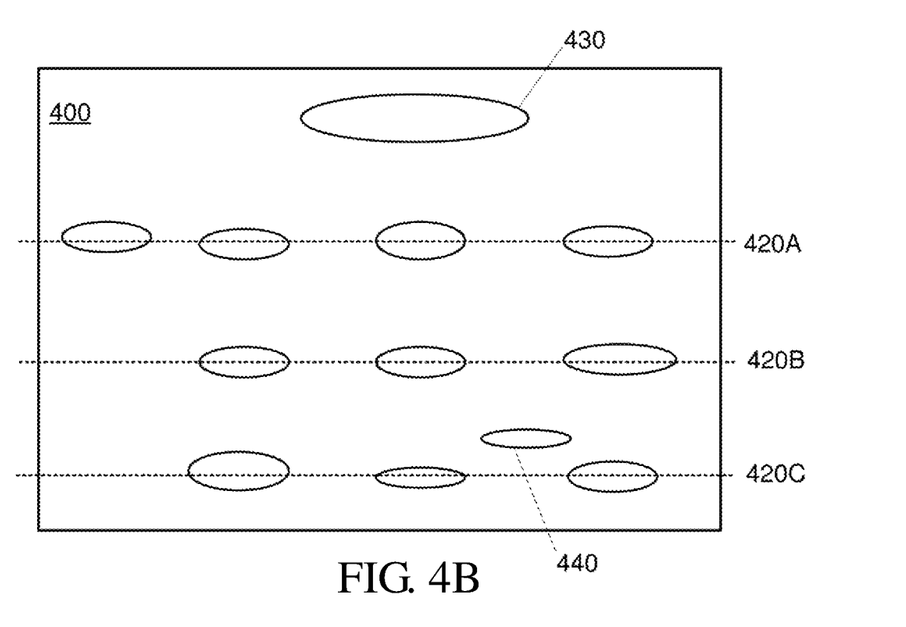
Figure 4C:
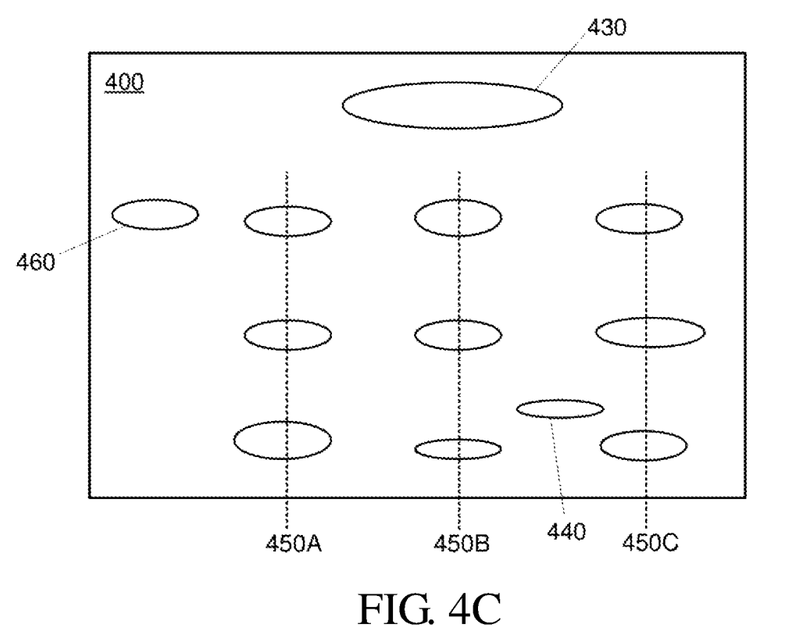
Figure 4D:
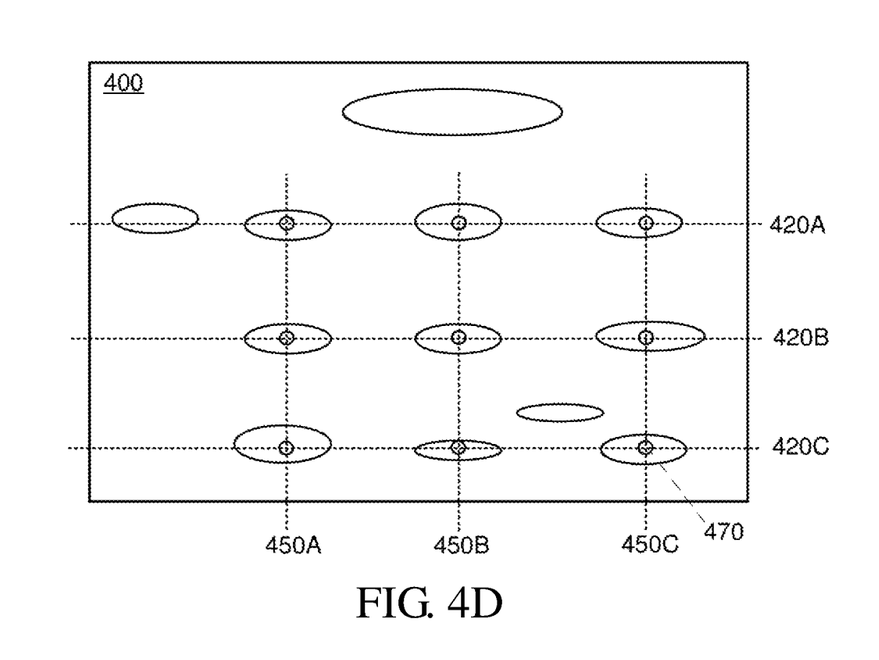

Referring now to FIGS. 4A-4E, shown is an example mapping 400 of potential input elements 410, in accordance with one or more implementations. Specifically, the FIGS. 4A-4E, shown is an example mapping 400 during various operations of automated identification of input elements (e.g., by GUI analysis module 140). As shown in FIG. 4A, the mapping 400 may illustrate each potential input element 410 as a detected blob having a particular location, shape, and size. Note that the mapping 400 is not intended to correspond to GUIs 200, 250 (shown in FIG. 2A-2B), and thus the potential input elements 410 do not correspond to the screen elements of GUIs 200, 250.

Referring again to FIG. 3, block 320 may include determining a set of rows including potential input elements that are in a horizontal alignment and in a same size range. For example, referring to FIGS. 1 and 4B, the GUI analysis module 140 may identify rows 420A-420C in the potential input elements (i.e., identified at block 310) that are in a horizontal alignment and have a similar size. In one or more implementations, the determination of size and/or horizontal alignment may be based on specified thresholds. For example, the GUI analysis module 140 may determine the row 420A by identifying a group of four elements that are within a defined vertical range. In some implementations, the defined vertical range may be bounded by a distance or proportion above a horizontal fit line, and by a distance or proportion below the horizontal fit line (e.g., no more than 5 pixels above or below a horizontal line fit through the elements, no more than 10 percent above or below the horizontal line fit, and so forth). Further, the GUI analysis module 140 may determine the row 420A if the identified group of four elements that are within the vertical range are also determined to within a defined size range (e.g., between 10 to 20 pixels), within a defined size variation (e.g., size does not differ from the other elements by more than plus or minus 30 percent), and so forth. Similarly, the GUI analysis module 140 may determine the rows 420B, 420C by identifying two groups of elements that share a similar size and are in a horizontal alignment. Assume that, in the example of FIG. 4B, the element 440 is determined to not be in horizontal alignment with other elements, and thus is not included in any row. Assume further that the element 430 is determined to not be of similar size or in horizontal alignment with other elements, and thus is not included in any row.

Referring again to FIG. 3, block 330 may include determining a set of columns including potential input elements that are in a vertical alignment and in a same size range. For example, referring to FIGS. 1 and 4C, the GUI analysis module 140 may identify columns 450A-450C in the potential input elements that are in a horizontal alignment and have a similar size. In some implementations, the determination of vertical alignment may be based on specified thresholds. For example, the GUI analysis module 140 may determine the column 450A by identifying three elements that are within a defined horizontal range. In some implementations, the defined horizontal range may be bounded by a distance or proportion to the right of a vertical fit line, and by a distance or proportion to the left of a vertical fit line (e.g., no more than 5 pixels to the right or left of a vertical line fit through the elements, no more than 10 percent to the right or left of a vertical line fit, and so forth). Further, the GUI analysis module 140 may determine the column 450A if the identified elements are within a defined size range, variation, etc. Assume that, in the example of FIG. 4C, the elements 440 and 460 are determined to not be in vertical alignment with other elements, and thus are not included in any column. Further, assume that the element 430 is determined to not have a similar size to other elements, and thus is not included in any column.

Figure 4E:
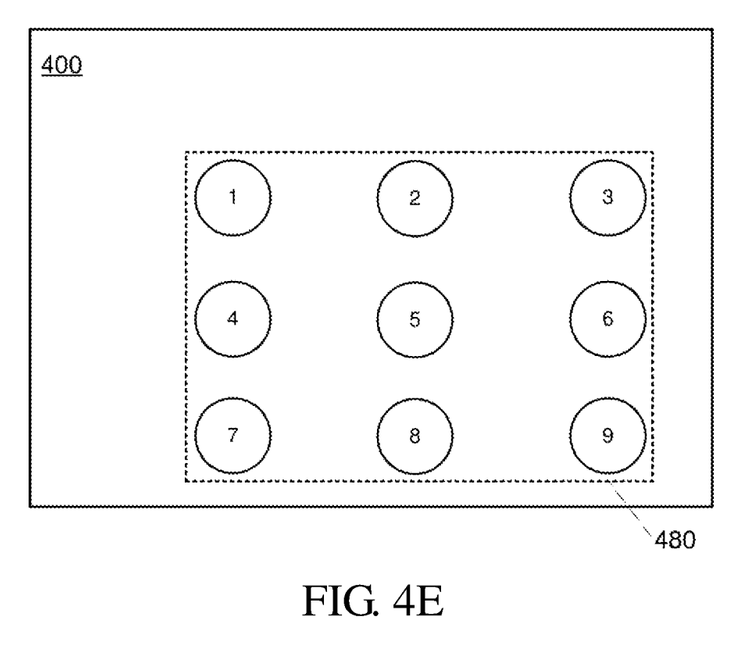

Referring again to FIG. 3, block 340 may include determining a set of input elements comprising multiple potential input elements that are located at intersections of the identified set of rows and the identified set of columns. For example, referring to FIGS. 1 and 4D, the GUI analysis module 140 may determine intersections 470 of the rows 420 and the columns 450. Further, the GUI analysis module 140 may use the determined intersections 470 to identify the set of input elements for use in automated testing. For example, FIG. 4E illustrates a set of input elements 480 corresponding to the potential input elements that are located at the determined intersections 470 (shown in FIG. 4D). In some implementations, as shown in FIG. 4E, the set of input elements 480 may be assigned an index value (e.g., a numeric identifier) that is used to identify the input elements 480 during automated testing.

In some implementations, the GUI analysis module 140 may use the target patterns 160 as part of (or to assist in) identifying the set of input elements. For example, the target patterns 160 may store data indicating desired or expected patterns of input element locations within a GUI (e.g., a three-by-three grid, a four-by-three grid, etc.). In some examples, the GUI analysis module 140 may optionally compare the potential input elements located at the intersections 470 to a desired target pattern 160, and may ignore a potential input element that fails to conform to the target pattern 160. Stated differently, the potential input element that does not match the target pattern 160 is not included in the identified set of input elements for use testing.

In some implementations, the GUI analysis module 140 may perform optical character recognition (OCR) to determine any text characters associated with the identified set of input elements. For example, referring to FIGS. 1 and 4E, the GUI analysis module 140 may determine text characters (e.g., "3", "Enter", etc.) associated with each of the set of input elements 480. In some implementations, the determined text characters may be used to perform automated testing. For example, referring to FIGS. 1 and 2A, the GUI analysis module 140 may identify the input elements 215 as the set of elements for testing, and may perform OCR to determine the numeric values for automated testing of the GUI 200 (e.g., to simulate user entry of PIN codes in the GUI 200).

Referring again to FIG. 3, block 350 may include performing automated testing of the GUI using the determined set of input elements. For example, referring to FIG. 1, the testing module 150 may simulate user interactions with the identified set of input elements during automated testing of the GUI. After block 350, the process 300 is completed.

Figure 5:
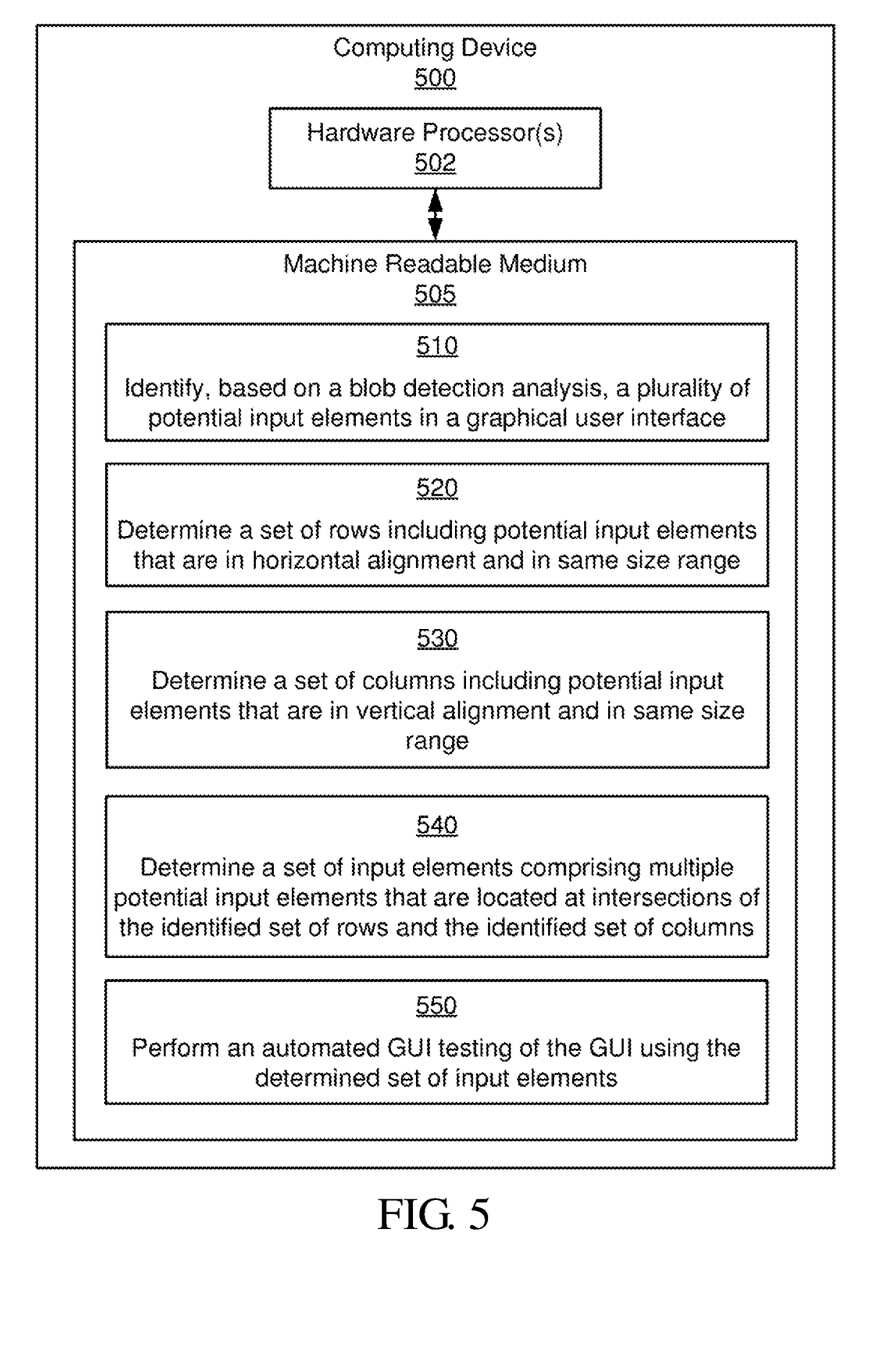
FIG. 5 is a schematic diagram of an example computing device, in accordance with some implementations.

Referring now to FIG. 5, shown is a schematic diagram of an example computing device 500. In some examples, the computing device 500 may correspond generally to the computing device 100 shown in FIGS. 1-2. As shown, the computing device 500 may include hardware processor(s) 502 and machine-readable storage medium 505. The machine-readable storage medium 505 may be a non-transitory medium, and may store instructions 510-550. The instructions 510-550 can be executed by the hardware processor(s) 502.

Instruction 510 may be executed to identify, based on a blob detection analysis, a plurality of potential input elements in a graphical user interface (GUI). For example, referring to FIGS. 1-2A, the GUI analysis module 140 may perform a blob detection analysis of the GUI 200.

Instruction 520 may be executed to determine a set of rows including potential input elements that are in a horizontal alignment and in a same size range. For example, referring to FIGS. 1 and 4B, the GUI analysis module 140 may identify rows 420A-420C in the potential input elements that are in a horizontal alignment and have a similar size.

Instruction 530 may be executed to determine a set of columns including potential input elements that are in a vertical alignment and in a same size range. For example, referring to FIGS. 1 and 4C, the GUI analysis module 140 may identify columns 450A-450C in the potential input elements that are in a horizontal alignment and have a similar size.

Instruction 540 may be executed to determine a set of input elements comprising multiple potential input elements that are located at intersections of the identified set of rows and the identified set of columns. For example, referring to FIGS. 1, 4D, and 4E, the GUI analysis module 140 may identify the set of input elements 480 based on the intersections 470 of the rows 420 and the columns 450.

Instruction 550 may be executed to perform an automated testing of the GUI using the determined set of input elements. For example, referring to FIG. 1, the testing module 150 may simulate user interactions with the identified set of input elements during automated testing of the GUI.

Figure 6:
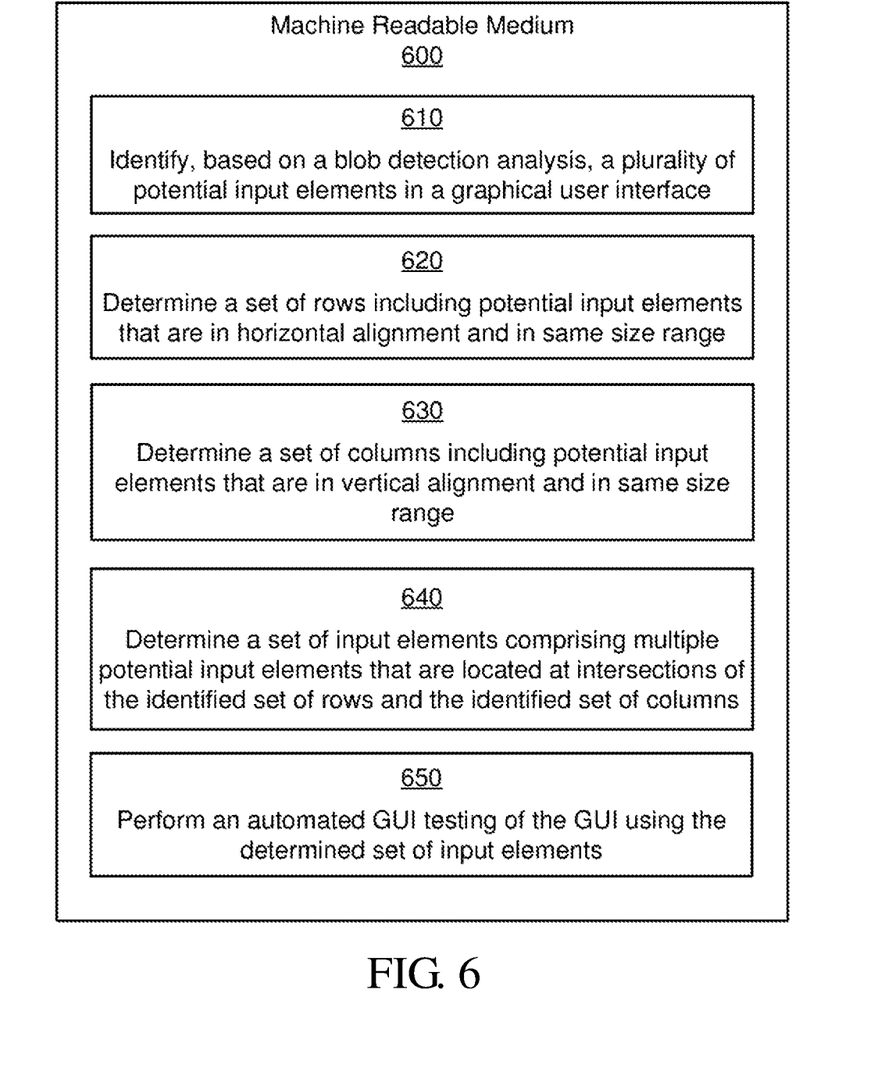
FIG. 6 is a diagram of an example machine-readable medium storing instructions in accordance with some implementations.

Referring now to FIG. 6, shown is machine-readable medium 600 storing instructions 610-650, in accordance with some implementations. The instructions 610-650 can be executed by any number of processors (e.g., the processor(s) 110 shown in FIG. 2). The machine-readable medium 600 may be a non-transitory storage medium, such as an optical, semiconductor, or magnetic storage medium.

Instruction 610 may be executed to identify, based on a blob detection analysis, a plurality of potential input elements in a graphical user interface (GUI). Instruction 620 may be executed to determine a set of rows including potential input elements that are in a horizontal alignment and in a same size range. Instruction 630 may be executed to determine a set of columns including potential input elements that are in a vertical alignment and in a same size range. Instruction 640 may be executed to determine a set of input elements comprising multiple potential input elements that are located at intersections of the identified set of rows and the identified set of columns. Instruction 650 may be executed to perform an automated testing of the GUI using the determined set of input elements.

Note that, while FIGS. 1-6 show various examples, other implementations are contemplated. For example, referring to FIG. 1, it is contemplated that the computing device 100 may include additional components, fewer components, or different components. Further, while FIGS. 2A-2B and 4A-4E illustrate various example GUIs and elements, implementations are not limited in this regard. Further, some implementations may exclude the use of OCR and/or the target patterns 150. Other combinations and/or variations are also possible.

In accordance with some implementations, examples are provided for automated identification of input elements in a GUI. In some examples, the identification technique may include performing a blob detection analysis on an image of the GUI. The blob detection analysis may identify potential input elements that can be used to form rows and columns. The intersections of the rows and columns may be used to automatically identify a set of input elements for automated testing of the GUI. Accordingly, some implementations may provide improved automated testing of GUIs.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer implemented method, comprising:
   identifying, based on a blob detection analysis, a plurality of potential input elements in a graphical user interface (GUI);
   defining for each of the identified plurality of potential input elements, a location and size of a detected blob corresponding to the potential input element;
   determining a set of rows including potential input elements that are horizontally aligned by being located within a defined vertical range and in a same size range but excluding potential input elements that are not in the horizontal alignment and/or not in the same size range, wherein determining the set of rows comprises;
   identifying a first group of potential input elements that are within the defined vertical range and a second group of potential input elements that are outside of the defined vertical range;
   determining that each of a first subgroup of the identified first group of potential input elements is within a defined size range and each of a second subgroup of the identified first group of potential input elements is outside of the defined size range; and
   in response to a determination that each of the first subgroup of the identified first group of potential input elements is within the defined size range, determining a row including the first subgroup of the identified first group of potential input elements but not the second group or second subgroup of the identified first group of potential input elements;
   determining a set of columns including potential input elements that are vertically aligned by being located within a defined horizontal range and in a same size range but excluding potential input elements that are not in the vertical alignment and/or not in the same size range;
   determining a set of input elements comprising multiple potential input elements that are located at intersections of the determined set of rows and the determined set of columns; and
   performing automated testing of the GUI using the determined set of input elements.

2. The computer implemented method of claim 1, further comprising:
   identifying a third group of potential input elements that are within the defined horizontal range and a fourth group of potential input elements that are outside of the defined horizontal range;
   determining that each of a first subgroup of the identified third group of potential input elements is within the defined size range and each of a second subgroup of the identified third group of potential input elements is outside of the defined size range; and
   in response to a determination that each of the first subgroup of the identified third group of potential input elements is within the defined size range, determining a column including the first subgroup of the identified third group of potential input elements but not the fourth group or second subgroup of the identified third group of potential input elements.

3. The computer implemented method of claim 2, wherein:
   the defined vertical range is bounded by a distance above a horizontal fit line and a distance below the horizontal fit line; and
   the defined horizontal range is bounded by a distance to the right of a vertical fit line and a distance to the left of the vertical fit line.

4. The computer implemented method of claim 1, wherein the definition of the location and size comprises the definition for each of the plurality of potential input elements, of a shape of the detected blob corresponding to a potential input element and further comprising:
   comparing the multiple potential input elements located at the intersections to a stored target pattern;

determining that a first potential input element of the multiple potential input elements does not match the stored target pattern; and in response to a determination that the first potential input element does not match the stored target pattern, excluding the first potential input element from the determined set of input elements.

5. The computer implemented method of claim 1, wherein the blob detection analysis comprises detecting regions that have one or more different properties than surrounding regions, the one or more different properties comprising one or more of brightness and color, and wherein detected blobs correspond to the plurality of potential input elements and one or more display elements not requiring user input and further comprising:

performing the blob detection analysis based on a based on differential analysis of the GUI.

6. A non-transitory machine-readable storage medium storing instructions that upon execution cause a processor to:

identify, based on a blob detection analysis, a plurality of potential input elements in a graphical user interface (GUI);

define for each of the identified plurality of potential input elements, a location and size of a detected blob corresponding to the potential input element;

determine a set of rows including potential input elements that are horizontally aligned by being within a defined vertical range and in a same size range but excluding potential input elements that are not in the horizontal alignment and/or not in the same size range;

determine a set of columns including potential input elements that are vertically aligned by being within a defined horizontal range and in a same size range but excluding potential input elements that are not in the vertical alignment and/or not in the same size range, wherein the determining of the set of columns comprises:

identify a first group of potential input elements that are within the defined horizontal range and a second group of potential input elements that are outside of the defined horizontal range;

determine that each of a first subgroup of the identified first group of potential input elements is within the size range and each of a second subgroup of the identified first group of potential input elements is outside of the size range; and in response to a determination that each of the first subgroup of the identified first group of potential input elements is within the size range, determine a column including the first subgroup of the identified first group of potential input elements but not the second group or second subgroup of the identified first group of potential input elements;

determine a set of input elements comprising multiple potential input elements that are located at intersections of the determined set of rows and the determined set of columns; and perform automated testing of the GUI using the determined set of input elements.

7. The non-transitory machine-readable storage medium of claim 6, wherein the instructions further cause the processor to:

identify a third group of potential input elements that are within the defined vertical range and a fourth group of potential input elements that are outside of the defined vertical range;

determine that each of a first subgroup of the identified third group of potential input elements is within a defined size range and each of a second subgroup of the identified third group of potential input elements is outside of the defined size range; and in response to a determination that each of the first subgroup of the identified third group of potential input elements is within the defined size range, determine a row including the first subgroup of the identified third group of potential input elements but not the fourth group or second subgroup of the identified third group of potential input elements.

8. The non-transitory machine-readable storage medium of claim 7, wherein:

the defined vertical range is bounded by a distance above a horizontal fit line and a distance below the horizontal fit line; and the defined horizontal range is bounded by a distance to the right of a vertical fit line and a distance to the left of the vertical fit line.

9. The non-transitory machine-readable storage medium of claim 6, wherein each of the determined set of input elements is associated with a text value that is randomized for each presentation of the GUI, wherein the blob detection analysis comprises detecting regions that have one or more different properties than surrounding regions, the one or more different properties comprising one or more of brightness and color, and wherein detected blobs correspond to the plurality of potential input elements and one or more display elements not requiring user input.

10. The non-transitory machine-readable storage medium of claim 6, wherein the instructions cause the processor to:

compare the multiple potential input elements located at the intersections to a stored target pattern;

determine that a first potential input element of the multiple potential input elements does not match the stored target pattern; and in response to a determination that the first potential input element does not match the stored target pattern, exclude the first potential input element from the determined set of input elements.

11. The non-transitory machine-readable storage medium of claim 6, wherein the definition of the location and size comprises the definition for each of the plurality of potential input elements, of a shape of the detected blob corresponding to a potential input element and wherein the instructions cause the processor to:

perform optical character recognition (OCR) to determine text characters associated with the determined set of input elements; and simulate a user entry in the GUI using the determined text characters.

12. A computing device comprising:

a hardware processor; and a machine-readable storage medium storing instructions, the instructions being executable by the hardware processor to:

identify, based on a blob detection analysis, a plurality of potential input elements in a graphical user interface (GUI);

define for each of the identified plurality of potential input elements, a location and size of a detected blob corresponding to the potential input element;

determine a set of rows including potential input elements that are in a horizontal alignment by being located within a defined vertical range and in a same size range but excluding potential input elements that are not in the horizontal alignment and/or not in the same size range, wherein the determining of the set of rows comprises:
  identify a first group of potential input elements that are within the defined vertical range and a second group of potential input elements that are outside of the defined vertical range;
  determine that each of a first subgroup of the identified first group of potential input elements is within a defined size range and each of a second subgroup of the identified first group of potential input elements is outside of the defined size range; and
  in response to a determination that each of the first subgroup of the identified first group of potential input elements is within the defined size range, determine a row including the first subgroup of the identified first group of potential input elements but not the second group or second subgroup of the identified first group of potential input elements;
determine a set of columns including potential input elements that are in a vertical alignment by being located within a defined horizontal range and in a same size range but excluding potential input elements that are not in the vertical alignment and/or not in the same size range;
determine a set of input elements comprising multiple potential input elements that are located at intersections of the determined set of rows and the determined set of columns; and
perform automated testing of the GUI using the determined set of input elements.

13. The computing device of claim 12, wherein the instructions are executable by the hardware processor to:
  identify a third group of potential input elements that are within the defined horizontal range and a fourth group of potential input elements that are outside of the defined horizontal range;
  determine that each of a first subgroup of the identified third group of potential input elements is within the defined size range and each of a second subgroup of the identified third group of potential input elements is outside of the defined size range; and
  in response to a determination that each of the first subgroup of the identified third group of potential input elements is within the defined size range, determine a column including the first subgroup of the identified third group of potential input elements but not the fourth group or second subgroup of the identified third group of potential input elements.

14. The computing device of claim 13, wherein:
  the defined vertical range is bounded by a distance above a horizontal fit line and a distance below the horizontal fit line; and
  the defined horizontal range is bounded by a distance to the right of a vertical fit line and a distance to the left of the vertical fit line.

15. The computing device of claim 12, wherein each of the determined set of input elements is associated with a text value that is randomized for each presentation of the GUI, wherein the blob detection analysis comprises detecting regions that have one or more different properties than surrounding regions, the one or more different properties comprising one or more of brightness and color, and wherein detected blobs correspond to the plurality of potential input elements and one or more display elements not requiring user input.

16. The computing device of claim 12, wherein the instructions are executable by the hardware processor to:
  compare the multiple potential input elements located at the intersections to a stored target pattern;
  determine that a first potential input element of the multiple potential input elements does not match the stored target pattern; and
  in response to a determination that the first potential input element does not match the stored target pattern, exclude the first potential input element from the determined set of input elements.

17. The computing device of claim 12, wherein the definition of the location and size comprises the definition for each of the plurality of potential input elements, of a shape of the detected blob corresponding to a potential input element and wherein the instructions are executable by the hardware processor to:
  perform optical character recognition (OCR) to determine text characters associated with the determined set of input elements; and
  simulate a user entry in the GUI using the determined text characters.

* * * * *